Figure 1:
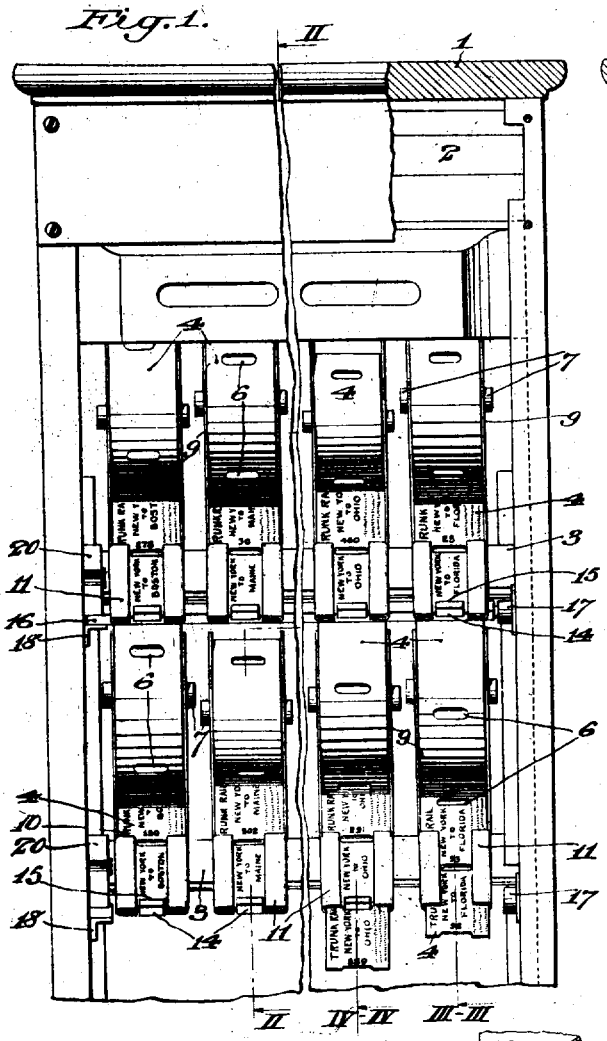

J. J. CARR.

TICKET CASE.

APPLICATION FILED APR. 16, 1921.

Reissued June 7, 1921. 15,118.

Inventor:-
John J. Carr
By his Attorneys
Bros & Sward

UNITED STATES PATENT OFFICE.

JOHN J. CARR, OF YONKERS, NEW YORK.

TICKET-CASE.

15,118. Specification of Reissued Letters Patent. Reissued June 7, 1921.

Original No. 1,373,797, dated April 5, 1921, Serial No. 189,976, filed September 6, 1917. Application for reissue filed April 16, 1921. Serial No. 462,049.

*To all whom it may concern:*

Be it known that I, JOHN J. CARR, a citizen of the United States, and resident of Yonkers, in the county of Westchester and State of New York, have invented a new and useful Improvement in Ticket-Cases, of which the following is a specification.

This invention relates to an improvement in ticket cases and to a particular form of ticket adapted for use therein, with the object in view of providing such a device that is arranged to prevent ticket agents from indulging in that form of embezzlement which is commonly referred to as "selling back" in stock tickets.

Another object is to provide such a device which is relatively simple and cheap in construction, and in which the novel parts may be encompassed in cases substantially similar to those now in use for the dispensing of railroad tickets.

A further object consists in providing such an arrangement in which the mechanical parts coöperate with a particular form of ticket to effect the desired result.

A still further object consists in providing certain improvements in the form, construction and arrangement of the several parts whereby the above-named and other advantages may be effectively attained.

Railroad card tickets are usually sold separately and they are generally held in the case in a series of tubes which have the front end open and exposed. The tickets are serially numbered and it is the custom to have the tubes hold about two hundred and fifty tickets each. As a ticket is sold, the agent withdraws it from the open end of the tube, and the whole stack of tickets in the tube moves forward (generally under the influence of a ball or marble actuated by gravity) so as to bring the ticket bearing the next number to the very front of the tube. This operation is continued until the supply of tickets in any given tube is exhausted.

When the accounts of an agent are made up, either at the end of a working period, or when the agent is relieved by another, or at the time of closing the ticket office, or when the agent is leaving his position, or when a traveling auditor is making an inspection, or at any time, it is customary to examine the numbers on the tickets appearing at the front of each tube, and to figure therefrom the number of each kind of tickets (including class, point of departure, and destination) which have been sold, and thereby estimate the amount of cash which the agent should have on hand. It has been found, however, that dishonest agents, instead of selling the tickets at the front of the tube, would, occasionally, remove tickets from the intermediate or rear portion of the tube and retain the money realized from the sale thereof. This delinquency would not generally be discovered until the break in the serial numbers was reached, or until some thorough examination and individual count was made of the tickets in the tubes. Consequently, when the matter was discovered, it was very difficult to determine which particular agent had been guilty of the theft, and, if there had been only one agent in charge, he would frequently claim that the tickets had been delivered by the printer arranged in wrong order.

This form of embezzlement also extended to the surplus stock of tickets at hand, not in the tubes; and, in the effort to overcome the same, it has been customary to seal the surplus stock of tickets in packages of two hundred and fifty each, so that the auditor or other party investigating the stock would simply have to count the number of packages. This step has proved quite satisfactory with regard to surplus stock, but it has in no way tended to prevent the "selling back" in the active stock, *i. e.*, the stock which is actually in the ticket case. In the effort to overcome this last named defect, arrangements have been provided whereby each ticket carried a stub that was to be torn off, and filed as the ticket was sold. It was calculated that the auditor or other examining party would merely have to count the number of stubs in order to ascertain the amount of money the agent should have on hand. But even this arrangement did not prevent embezzlement by a dishonest agent, since he could destroy or throw away certain of the stubs.

My invention is designed to overcome this so-called "selling back" in the active ticket stock, while it also permits the surplus of tickets to be kept in sealed packages.

It saves the auditor's time and permits more frequent inspection, since the necessity for individual counting is eliminated and a cursory examination suffices. Furthermore, it is still possible to read the point of departure, destination, and number printed on the exposed ticket.

Figure 2:
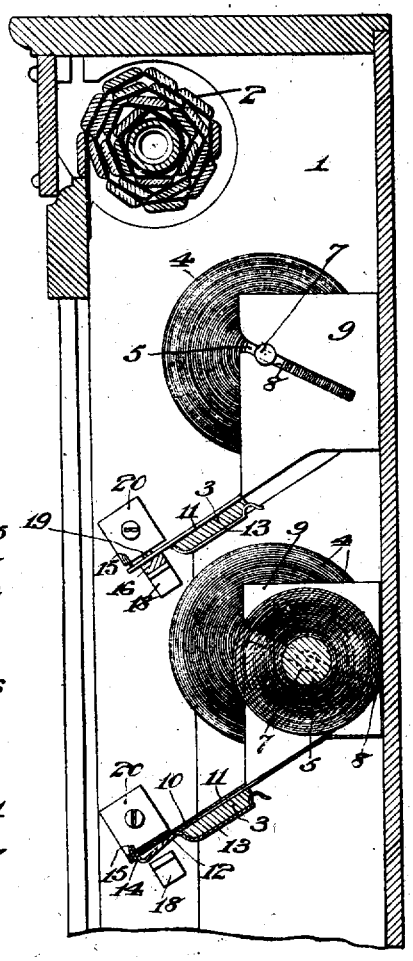
Figure 3:
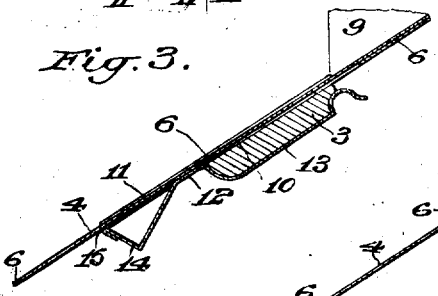
Figure 4:
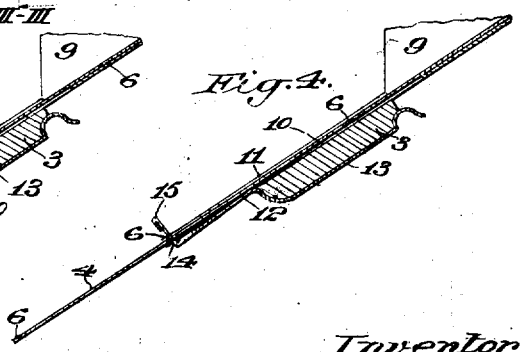
Figure 5:
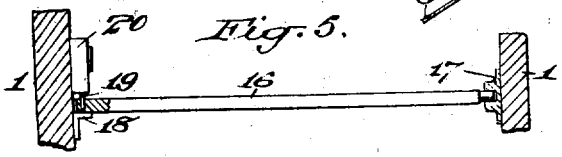

A practical embodiment of my invention is represented in the accompanying drawings, in which, Figure 1 represents a detail face view of a ticket case, partly broken away, Fig. 2 represents a vertical section taken in the plane of the line II—II of Fig. 1, looking in the direction of the arrows, Fig. 3 represents an enlarged detail section taken in the plane of the line III—III of Fig. 1, looking in the direction of the arrow, Fig. 4 represents a smiliar view taken in the plane of the line IV—IV of Fig. 1, looking in the direction of the arrow, and Fig. 5 represents an enlarged detail section, partly in elevation, of the means for locking the device to prevent the dispensing of tickets.

The case or cabinet is denoted by 1 and may be of any well known and approved form. It may be provided with the customary roll front 2, if desired.

The case has a series of transverse slats or bars 3 which extend in parallelism from side to side and are tilted somewhat downwardly toward the front. These bars may have the form and arrangement which is now customary in ticket cases that are fitted with the tubes above described, and to which bars the tubes are commonly removably secured by means of springs.

The tickets are in the form of a strip which is rolled up, as indicated at 4, on a core 5, and slots 6 are arranged between the successive tickets of the strip. The junction of the successive tickets is also weakened by line perforations (indicated by dotted lines, Fig. 1), which extend from the ends of the slots 6, to the edges of the tickets. I preferably provide a strip of such length as to contain two hundred and fifty tickets of substantially the ordinary railroad ticket size, although special rolls containing as many as a thousand tickets may be supplied for stations where the sale is heavy, so as to eliminate frequent replenishing of the supply in the case. The core 5 of the ticket roll has a pair of laterally extending trunnions 7 which are adapted to fit and slide in slits 8, that are formed in the sides of a ticket roll holder 9.

This holder 9 may be composed of some material, such as sheet metal, and be substantially box like in form, but have its top and front open. The lower part of the holder 9 is projected forwardly and downwardly to constitute a ticket dispenser 10. This dispenser takes the form of a substantially flat guide having its lateral edges 11 turned upwardly and inwardly so as to normally lie over the ticket which is about to be dispensed.

A spring is secured to the dispenser 10, as indicated at 12, by soldering or riveting, or in any other suitable manner, and this spring is calculated to perform a double function.

The rearward extension, denoted by 13, is designed to snap over one of the bars 3 for the purpose of temporarily securing the ticket holder and dispenser in appropriate position in the case, as clearly indicated in Figs. 2, 3 and 4. The front portion, denoted by 14, has an upwardly extending nose 15 which is intended to enter the slots 6 between the successive tickets, as the latter are dispensed, for the purpose of assisting in the manual removing or tearing of the tickets from the strip, as clearly shown in Fig. 4.

It will be noted that when the nose 15 enters a slot 6, the ticket strip is held in such a position that the perforated line coincides with the edge of the dispenser, which latter aids in the tearing of the strip.

In operation, the desired number of holders 9 may be placed in position in the cabinet, as is customary with the tubes at present in use. In each holder, a roll 4 of strip tickets may be located by merely resting the trunnions 7 in the slits 8 in the sides of the holder, it being understood that the said roll will be unsealed before being placed in the holder. The first ticket, which is constituted by the end of the strip, may be passed down along the dispenser 10 and under the turned-up sides 11 until it engages the nose 15 of the spring member 14. In this condition, the tickets are ready to be dispensed, and in taking this step, the operator simply rests his thumb upon the nose 15 of the spring member 14. The weight of the hand at once depresses the spring until its nose is level with the dispenser 10, as shown in Fig. 3. At this moment the thumb comes to bear upon the initial ticket and the latter may be drawn forward over the nose 15 of the spring member 14, until the said nose registers with the slot 6 between the ticket which is being removed and the successive one. As soon as this registering occurs, the nose 15 will snap up through the said slot and prevent further forward movement of the ticket strip, the latter being held, as already indicated, with a perforation line in register with the front edge of the dispenser. In this position the operator simply tears the advanced ticket from the strip for disposal. This operation may be very easily and expeditiously performed with a minimum of effort upon the part of the operator.

It will be seen that, since the tickets are in strip form, it is not a simple matter for the operator to "sell back" in the ticket stock, since such an operation would require the removal of the roll, the unwinding of a part of the same, the tearing out of certain tickets, the rewinding of the roll and replacement of the same. Furthermore, it would be very difficult for the operator to satisfactorily rewind the strip of tickets so as to conceal from an auditor or inspector the fact that he had tampered with the roll. Hence, I believe that my arrangement substantially prohibits this "selling back" of the ticket stock which is in the case; and, as already indicated, the rolls may be kept in reserve supply in sealed packages, to prevent the illicit sale of tickets from the said stock.

It has also been found, when there are several agents in a single office, each one selling tickets from his own case, that occasionally, one agent will sell, from another agent's case when the latter is temporarily absent from his post, and retain the proceeds of the said sale. In order to prevent such an occurrence, in connection with the use of my invention, I provide means for locking the dispenser, and particularly the spring member 14, 15, so as to prevent the dispensing of tickets. This locking arrangement consists of a rod 16, one end of which is adapted to be inserted in a cup or socket 17 secured to or formed on the inner face of the side of the case 1, just below and in front of each cross bar 3.

The other end of the rod 16 is fitted to engage a lug 18 secured to the other side of the case 1 opposite the socket 17, and be locked in position against said lug by the bolt 19 of a lock 20, which latter is secured to the wall of the casing 1 immediately above the lug 18. When the rod 16 is in locked position, as shown in Fig. 5, it serves to hold all of the spring members 14 which are supported by the adjacent cross rod 3, in their normal position with the noses 15 extending upwardly beyond the dispenser 10. In this condition the said noses cannot be depressed by the thumb of the operator, and hence the dispensing of the tickets is prevented.

It will be noted that the slits 8 in the holders 9 are arranged at an angle so that, as the tickets are withdrawn from the roll 4 and the latter is reduced in size, it will continuously move toward the rear of the holder and retain its periphery in contact with the back thereof. This contact serves to apply a certain amount of frictional resistance to the unwinding of the roll 4 so that it will not unroll except as force is exerted to draw the tickets therefrom.

I am aware that tickets have sometimes been sold in strip form from rolls, but I do not know that they have been provided with slots or arranged to coöperate with other parts to effect the results derived from my invention. Furthermore, it has been customary for agents in dispensing tickets from a roll, when a number are called for at the same time by one purchaser, to simply unroll five or ten tickets, as the case may be, and tear them off from the strip in one continuous length. Advantage has sometimes been taken of this condition by the user, who would tear a strip of five tickets into six parts of substantially equal length, and thereby obtain six rides for the price of five. My invention prevents such occurrence, and moreover, since the tickets may so rapidly and easily be dispensed in separate form, there is a minimum of inducement for the operator to sell a number of tickets without severing them.

It will be understood that various changes may be resorted to in the form, construction and arrangement of the several parts without departing from the spirit and scope of my invention; hence I do not intend to be limited to the details herein shown and described except as they may be specifically included in the claims.

What I claim is:—

1. A device of the character described comprising, a holder for a strip of tickets, said strip being provided with slots intermediate the successive tickets, a dispenser for the tickets arranged to engage the side edges of the ticket while leaving substantially the whole face of the ticket uncovered so as to expose the printed matter thereupon, and a spring actuated finger located behind the dispenser and normally passing through one of said slots for arresting the movement of the strip and facilitating the removal of a ticket therefrom, the end of the said finger normally projecting in front of the dispenser so that, in the natural act of placing the operator's thumb upon a ticket to withdraw it from the dispenser, the thumb will engage the said projecting end of the finger and temporarily depress it for permitting the withdrawal of a ticket.

2. A device of the character described comprising, a holder for a strip of tickets, said strip being provided with slots intermediate the successive tickets, a dispenser for the tickets, and a spring actuated finger located behind the dispenser and normally passing through one of said slots for arresting the movement of the strip and facilitating the removal of a ticket therefrom, the end of the said finger normally projecting in front of the dispenser so that, in the natural act of placing the operator's thumb upon the ticket to withdraw it from the dispenser, the thumb will engage the said projecting end of the finger and temporarily depress it for permitting the withdrawal of a ticket.

3. A device of the character described comprising, a holder for a strip of tickets, said strip being provided with slots intermediate the successive tickets, said slots being elongated and spaced from the side edges of the ticket strip, a dispenser for the tickets, and a spring-actuated finger located behind the dispenser and having a relatively wide nose normally passing through one of said slots for arresting the movement of the strip and facilitating the removal of a ticket therefrom, the said nose normally projecting in front of the dispenser so that, in the natural act of placing the operator's thumb upon the ticket to withdraw it from the dispenser, the thumb will engage the said nose and temporarily depress it for permitting the withdrawal of a ticket.

4. A device of the character described comprising, a holder for a strip of tickets, said strip being provided with slots intermediate the successive tickets, said slots being elongated and spaced from the side edges of the ticket strip, a dispenser for the tickets, said dispenser having a notch in its front end conforming substantially to the contour of one-half of one of said slots, and a spring-actuated finger located behind the dispenser and having a relatively wide nose normally engaging said notch and passing through one of said slots for arresting the movement of the strip and facilitating the removal of a ticket therefrom, the said nose normally projecting in front of the dispenser so that, in the natural act of placing the operator's thumb upon the ticket to withdraw it from the dispenser, the thumb will engage the said nose and temporarily depress it for permitting the withdrawal of a ticket.

5. A device of the character described comprising, a holder for a strip of tickets, a dispenser for the tickets, means for engaging a portion of the ticket strip to facilitate the manual separation of a ticket therefrom, and means for locking said last-named means in engagement with the strip to prevent the withdrawal of tickets from the dispenser.

6. A device of the character described comprising, a holder for a strip of tickets, said strip being provided with slots intermediate the successive tickets, a dispenser for the tickets, a finger adapted to successively engage the slots to arrest the movement of the strip and facilitate the manual separation of a ticket therefrom, and means for locking the said finger in engagement with the said slot to prevent the withdrawal of tickets from the dispenser.

7. A device of the character described comprising, a holder for a strip of tickets, said strip being provided with slots intermediate the successive tickets, a dispenser for the tickets, a spring actuated finger located behind the dispenser and normally passing through one of said slots for arresting the movement of the strip and facilitating the removal of a ticket therefrom, the end of the said finger normally projecting in front of the dispenser so that, in the natural act of placing the operator's thumb upon the ticket to withdraw it from the dispenser, the thumb will engage the said projecting end of the finger and temporarily depress it for permitting the withdrawal of a ticket, and means for locking the said finger in its said normal position to prevent the withdrawal of tickets from the dispenser.

8. A device of the character described comprising, a holder for a strip of tickets, said strip being provided with slots intermediate the successive tickets, said slots being equally spaced apart, a dispenser for the tickets, and a spring actuated finger materially smaller in cross section than the said slots, said finger being located behind the dispenser and normally passing through one of said slots for arresting the movement of the strip and facilitating the removal of a ticket therefrom, the end of the said finger normally projecting in front of the dispenser so that, in the natural act of placing the operator's thumb upon a ticket to withdraw it from the dispenser, the thumb will engage the said projecting end of the finger and temporarily depress it for permitting the withdrawal of a ticket.

In testimony that I claim the foregoing as my invention, I have signed my name this eleventh day of April, nineteen hundred and twenty-one.

JOHN J. CARR.